United States Patent
Mitani et al.

(10) Patent No.: US 7,725,355 B2
(45) Date of Patent: May 25, 2010

(54) INFORMATION PROCESSING APPARATUS AND METHOD FOR MANAGING ORDER DATA OF ON-LINE ORDERS, PROGRAM FOR THE SAME

(75) Inventors: Shigeyuki Mitani, Yokohama (JP); Toshiyuki Noguchi, Ohta-ku (JP); Yosato Hitaka, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1317 days.

(21) Appl. No.: 11/204,032

(22) Filed: Aug. 16, 2005

(65) Prior Publication Data
US 2006/0050300 A1  Mar. 9, 2006

(30) Foreign Application Priority Data
Sep. 3, 2004 (JP) ............................. 2004-257625

(51) Int. Cl.
*G06Q 30/00* (2006.01)
(52) U.S. Cl. ..................... 705/26; 705/27; 345/619; 348/219; 348/333.12; 348/219.1; 455/414; 455/41.2; 358/1.9
(58) Field of Classification Search ................... 705/26, 705/27; 345/619
See application file for complete search history.

(56) References Cited

U.S. PATENT DOCUMENTS

| | | | |
|---|---|---|---|
| 6,635,408 B2 * | 10/2003 | Kamijima | 430/313 |
| 6,886,028 B1 | 4/2005 | Matsuyama et al. | |
| 7,095,982 B2 * | 8/2006 | Mizutani | 455/41.2 |
| 7,286,164 B2 * | 10/2007 | Shinohara et al. | 348/219.1 |
| 7,453,506 B2 * | 11/2008 | Li | 348/333.12 |
| 2002/0037711 A1 * | 3/2002 | Mizutani | 455/414 |
| 2002/0081112 A1 * | 6/2002 | Morohashi et al. | 396/312 |
| 2002/0093681 A1 | 7/2002 | Hitaka | |
| 2002/0095351 A1 | 7/2002 | Hitaka | |
| 2002/0095352 A1 | 7/2002 | Hitaka | |
| 2002/0126210 A1 * | 9/2002 | Shinohara et al. | 348/219 |
| 2004/0041819 A1 * | 3/2004 | Barry et al. | 345/619 |
| 2004/0054983 A1 | 3/2004 | Noguchi | |
| 2005/0125721 A1 | 6/2005 | Morisada et al. | |
| 2005/0198122 A1 | 9/2005 | Saito et al. | |
| 2006/0161658 A1 | 7/2006 | Noguchi | |

FOREIGN PATENT DOCUMENTS

| | | |
|---|---|---|
| JP | 10-75300 | 3/1998 |
| JP | 2002-92419 | 3/2002 |
| JP | 2003-256382 | 9/2003 |
| JP | 2003-271852 | 9/2003 |
| JP | 2004-103010 | 4/2004 |

OTHER PUBLICATIONS

Lenk, Frank, "Get your summer in focus", Prince George Citizen, dated Jul. 19, 2002.*
Mills, Mike, "Picture this: Photos online; Kodak, AOL's service to send developed film to mailboxes", dated May 19, 1998.*
Berke et al, "New software puts photo proofs online", The Denver Business Journal, dated Jun. 17, 1999.*

* cited by examiner

*Primary Examiner*—Mark Fadok
(74) *Attorney, Agent, or Firm*—Fitzpatrick, Cella, Harper & Scinto

(57) ABSTRACT

When there is an inquiry about a deficiency point from a user who received a print product, a service provider side can properly deal with the inquiry. A server receives warning information on an edit process generated when the edit process not satisfying a preset condition is performed and edit data generated in the edit process, and associates with each other and registers the warning information and edit data.

2 Claims, 18 Drawing Sheets

| TOTAL NUMBER OF IMAGES | PAGE 1 | PAGES 2-3 | PAGES 4-5 | PAGES 6-7 | PAGES 8-9 | PAGES 10-11 | PAGE 12 |
|---|---|---|---|---|---|---|---|
| 5 | 0 | 1 | 1 | 1 | 1 | 0 | 0 |
| 6 | 0 | 1 | 1 | 2 | 1 | 1 | 0 |
| 7 | 1 | 1 | 1 | 2 | 1 | 1 | 0 |
| 8 | 1 | 2 | 1 | 2 | 1 | 1 | 0 |
| 20 | 2 | 4 | 2 | 2 | 4 | 4 | 2 |
| 21 | 2 | 5 | 2 | 2 | 4 | 4 | 2 |

IMAGE DATA ASSIGNMENT TABLE
— ASSIGNMENT MATRIX FOR 5 IMAGES
— ASSIGNMENT MATRIX FOR 6 IMAGES
— ASSIGNMENT MATRIX FOR 20 IMAGES
— ASSIGNMENT MATRIX FOR 21 IMAGES

FIG. 15

WARNING IMAGE LIST

| PAGE | IMAGE ID | WARNING |
|---|---|---|
| 6 | P0601 | SHORTAGE OF RESOLUTION |
| 10 | P0604 | FULL CHARACTERS |
| 10 | P0605 | SHORTAGE OF RESOLUTION |

FIG. 16

ORDER BOOK MANAGEMENT TABLE

| ORDER ID | BOOK ID |
|---|---|
| 200408020001 | BK0002 |
| 200408030003 | BK0004 |
| 200408030005 | BK0006 |

FIG. 17

WARNING IMAGE MANAGEMENT TABLE

| BOOK ID | PAGE | IMAGE ID | WARNING |
|---|---|---|---|
| BK0002 | 6 | P0601 | SHORTAGE OF RESOLUTION |
| BK0002 | 10 | P1004 | FULL CHARACTERS |
| BK0002 | 10 | P1005 | SHORTAGE OF RESOLUTION |

CLAIM MANAGEMENT TABLE

| BOOK ID | KIND OF CLAIM | DATE OF CLAIM | CONTENTS OF CLAIM |
|---|---|---|---|
| BK0002 | ABOUT IMAGE | 2004/08/15 | DELIVERED ALBUM INCLUDES BLURRED IMAGE IN PAGE 10. |
| BK0006 | OTHERS | 2004/08/18 | WRAPPING HAS BROKEN. |

INFORMATION PROCESSING APPARATUS AND METHOD FOR MANAGING ORDER DATA OF ON-LINE ORDERS, PROGRAM FOR THE SAME

BACKGROUND OF THE INVENTION

1. Field of the Invention

The present invention relates to technologies of, for example, creating album data at a user terminal by using template data and transmitting the data from the user terminal to an external apparatus on a network to order an album.

2. Related Background Art

A user terminal such as a personal computer can download template data from a server and edit an album by attaching contents such as image data and character data to template data.

Data edited at the user terminal is transmitted to a server, the server transfers the received edited data to a print site, and a print company providing the print site creates a print product of the album.

The template data downloaded from the server to the user terminal is suitable for editing a high quality print product. However, depending upon edited image data and character data, a final print product may become deficient such as an unclear image and an inability of entering all characters.

If contents having a possibility of degrading the quality of a print product are entered in an album, a user is warned at the editing stage.

However, irrespective of warning, some users request a service provider to make a print product. In this case, the print product sent to the user is deficient and the user inquires the service provider about the deficient point. On the side of the service provider, a history of warning at the editing stage is not managed so that the inquiry cannot be dealt properly.

SUMMARY OF THE INVENTION

It is an object of the invention to make a conversation smoothly between a service provider and a user and to make the service provider side properly deal with an inquiry about a deficient point from a user who received a print product.

According to an aspect of the present invention, an information processing apparatus of the present invention comprises: reception unit adapted to receive warning information on a data editing process generated if there is data not satisfying a predetermined condition during the data editing process, and edited data generated by the data editing process; and warning information registering unit adapted to associate with each other and registering the warning information and the edited data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 is a diagram showing an example of a warning image list.

FIG. 16 is a diagram showing an example of an order book management table.

FIG. 17 is a diagram showing an example a warning image management table.

DESCRIPTION OF THE PREFERRED EMBODIMENTS

Preferred embodiments of the present invention will be detailed with reference to the accompanying drawings.

Figure 1:
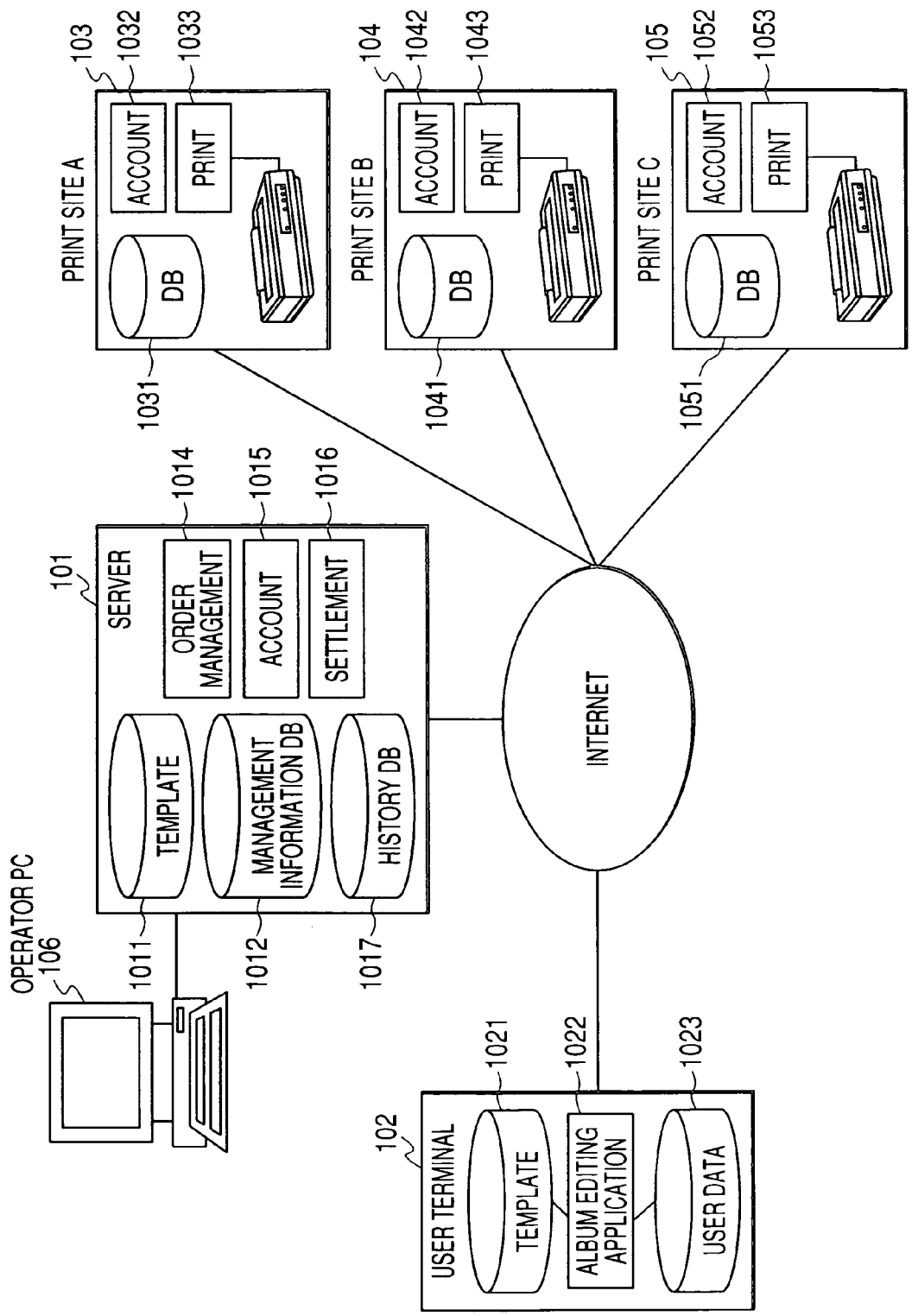
FIG. 1 is a diagram showing the outline structure of a printing system according to an embodiment of the present invention.

FIG. 1 is a diagram showing the outline structure of a printing system according to an embodiment of the invention.

The printing system shown in FIG. 1 is constituted of a server 101, a user terminal 102 and print sites 103 to 105. The server 101 has template data effective for forming high quality print products, supplies the user terminal 102 with the template data, and manages orders, settlement and the like of print products from the user terminal 102. The user terminal 102 downloads the template data from the server 101, forms desired edition data by using the downloaded template data, and orders print products. The print sites 103 to 105 are connected via the Internet and provided by print companies which actual book binding and the like in accordance with the order contents from the user terminal 102. An operator PC 106 is connected to the server 101 as an information processing apparatus to be used by an operator and connected via a communication line such as LAN. The network configuration shown in FIG. 1 is only illustrative and it is obvious that various configurations are possible, and the numbers of user terminals, print sites, operator PCs and servers may be determined as desired.

The server 101 has: a template storage 1011 for storing template data; a management information database (DB) 1012 for storing order management information, account information, settlement information and the like of albums; an order management unit 1014 for managing order results of albums; an account processing unit 1015 for performing account processings for album orders; a settlement processing unit 1016 for performing settlement processing; and a warning history DB 1017 for associating a history of warning at the stage of an album editing process at the user terminal 102 with related image data and storing the history.

The user terminal 102 has: a template storage 1021 for storing template data downloaded from the server 101; an album editing application 1022; and a user data storage 1023 for storing data of albums already edited or edited on.

Each of the print sites 103 to 105 has: a database 1031 for storing edited data of albums transferred from the server 101; a printing unit 1033 for printing edited data stored in the database 1031; and an accounting unit 1032 for charging fees of print processings.

Figure 3:
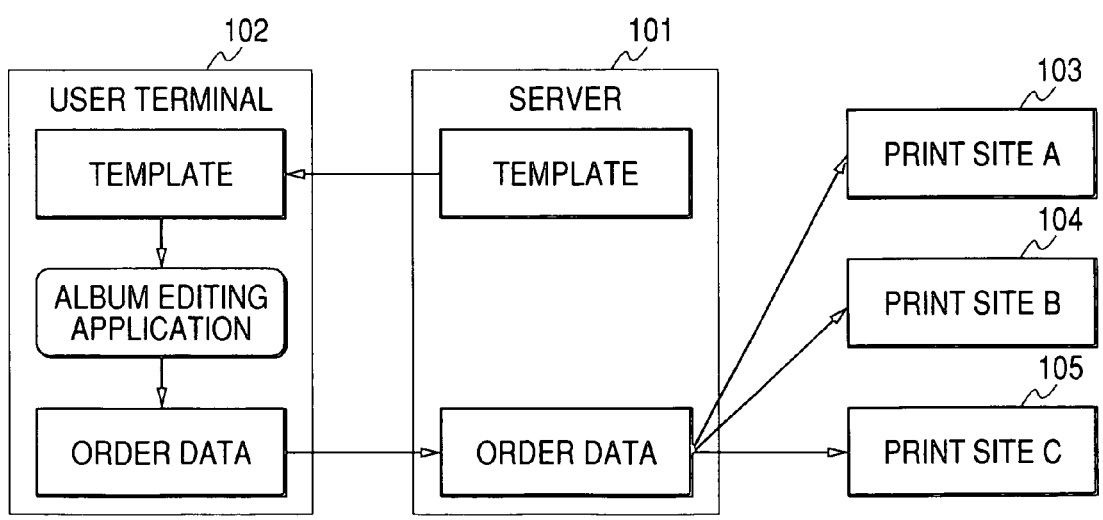
FIG. 3 is a diagram illustrating an operation of the printing system.

Next, with reference to FIG. 3, the operation of the printing system of the embodiment will be described. The user terminal 102 downloads template data from the server 101 and stores it. A user selects desired template data from the template data stored in the user terminal 102, and edits an album by attaching contents such as image data and character data to the template data.

When an edited album is ordered from the user terminal 102, the edited data is transmitted to the server 101 as the order data.

Upon reception of the order data from the user terminal 102, the server 101 selects a print company at which the order data is printed, and transmits the order data to the print site (e.g., the print site 103) of the selected company.

The print company of the print site 103 received the order data prints out the received order data to form an album. The printed album is sent to a designated delivery address.

Figure 2:
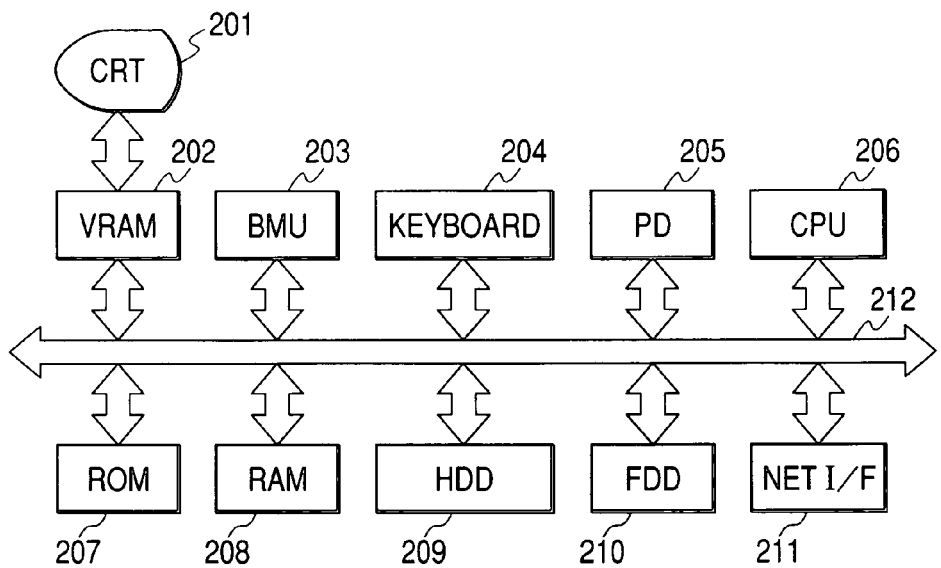
FIG. 2 is a diagram showing the hardware structures of a server and a user terminal.

FIG. 2 is a diagram showing the hardware structure of the server 101 and user terminal 102.

In FIG. 2, a CRT (display device) 201 displays on its screen, editing information such as documents, figures and images during editing, and user interface information such as icons, messages and menus.

A VRAM 202 draws therein an image to be displayed on the screen of CRT 201. Image data generated in VRAM 202 is transferred to CRT 201 in accordance with predetermined rules and CRT 201 displays images.

A bit move unit (BMU) 203 controls, for example, data transfer between memories (e.g., VRAM 202 and other memories) and data transfer between a memory and each I/O device (e.g., a network interface 211).

A keyboard 204 has various keys for inputting document data and the like. A pointing device 205 is used to point an icon, a menu or other objects displayed on the screen of CRT 201.

A CPU 206 controls each device connected to a CPU bus in accordance with control programs stored in a ROM 207 or a flexible disk.

ROM 207 stores various control programs and data. A RAM 208 has a working area for CPU 206, a data evacuation area during an error processing, a load area for control programs and the like.

A hard disk drive (HDD) 209 drives a hard disk which can store each control program to be executed by the server or user terminal and contents. For example, a hard disk of the user PC 102 stores electronic album data, album editing programs and the like.

A flexible disk drive (FDD) 210 controls an access to a flexible disk. The network interface 211 is used for communications with other information processing apparatuses, printers and the like.

A CPU bus 212 includes an address bus, a data bus and a control bus. The control programs for CPU 206 may be supplied from ROM 207, hard disks, and flexible disks, or from other information processing apparatuses or the like via the network interface 211.

Figure 4:
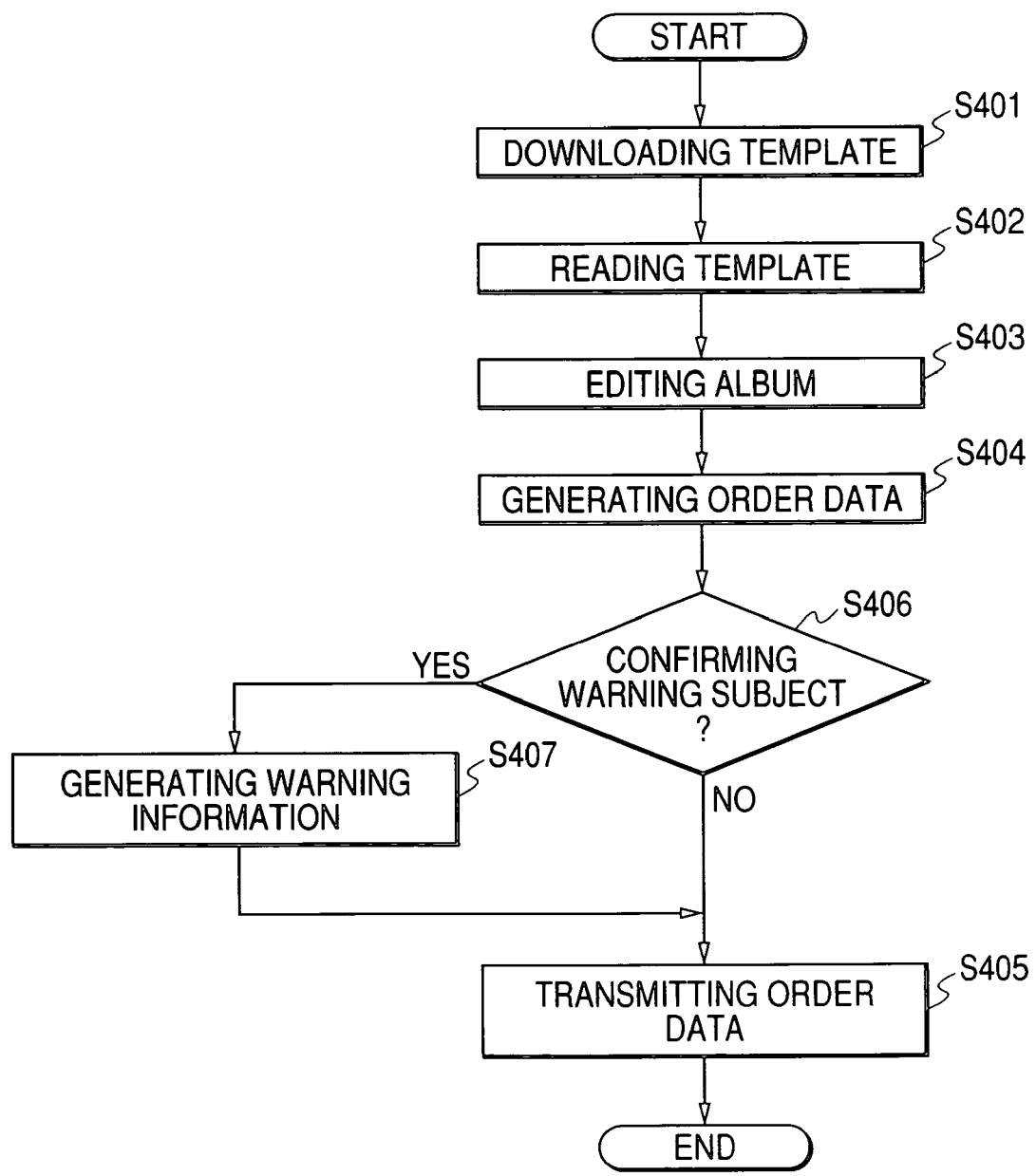
FIG. 4 is a flow chart illustrating an operation of the user terminal.
Figure 6:
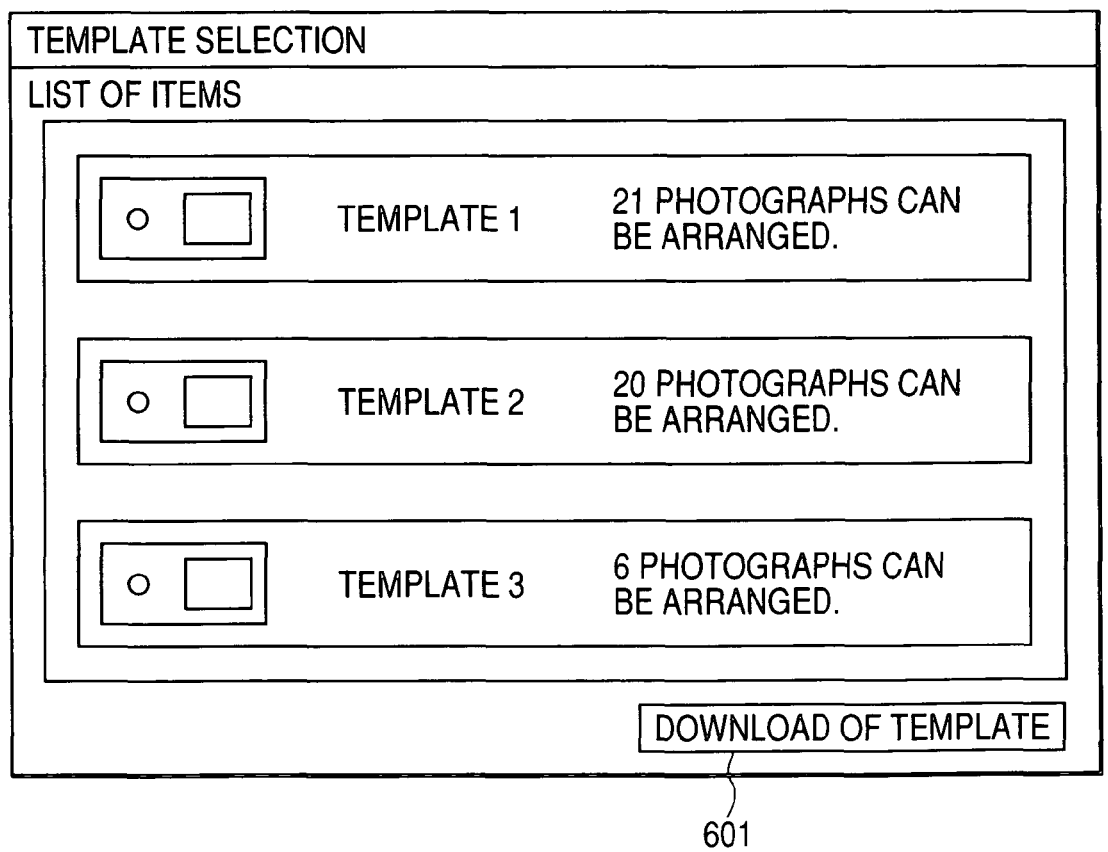
FIG. 6 is a diagram showing an example of the structure of a template selecting screen.

Next, with reference to the flow chart shown in FIG. 4, the operation of the user terminal 102 will be described. As a user operates the user terminal 102 to access the server 101 via the network interface 211, a template selecting screen such as shown in FIG. 6 can be displayed on CRT 201.

As the user selects a desired template from the template selecting screen and depresses a "template download" button 601, acquisition instruction information for the selected template is transmitted from the user terminal 102 to the server 101 via the network interface 211.

CPU 206 operates to download template data corresponding to the acquisition instruction information from the server 101 and to store it in a hard disk in HDD 209 (Step S401).

Figure 7:
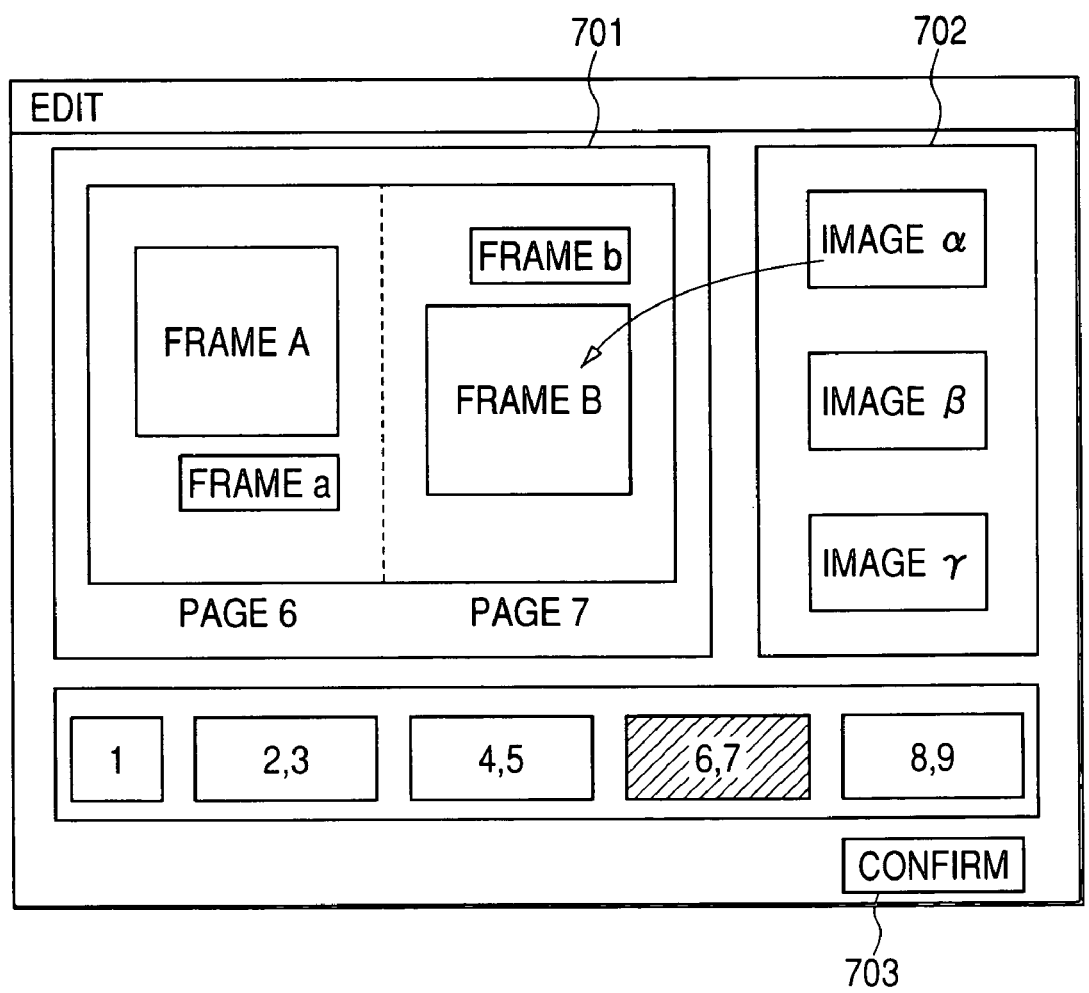
FIG. 7 is a diagram showing an example of the structure of an editing screen.

When the user selects desired template data from the template data stored in the hard disk in HDD 209, the selected template data is read from HDD 209 into VRAM 208 to display, for example, an editing screen shown in FIG. 7 on CRT 201 (Step S402).

The hard disk in HDD 209 stores also image data taken with a digital camera or the like. A portion or all of image data selected by the user is read into VRAM 208 and displayed on the editing screen shown in FIG. 7.

The user edits an album on the editing screen (Step S403). A template data display area 701 shown in FIG. 7 has a frame A and a frame B in which image data is arranged, and a character data frame a and a character data frame b in which corresponding character data is arranged. An image data display area 702 displays a list of stored image data.

Figures 13A, 13B:
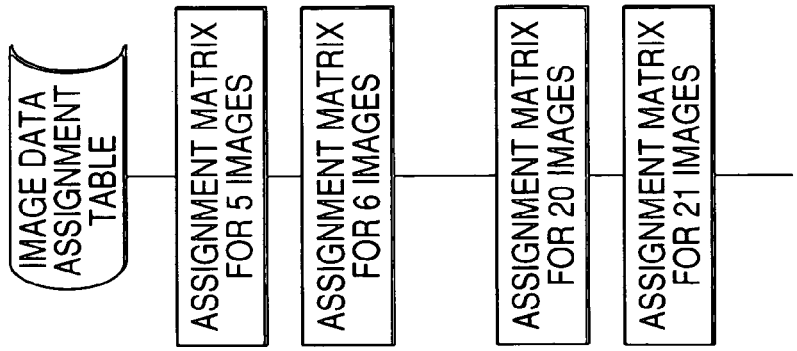
FIGS. 13A and 13B are schematic diagrams showing the structure of an image data assignment table.

Description will be made on a process of setting frames in the template data display area in which image data and character data are arranged. FIGS. 13A and 13B are schematic diagrams showing the structure of an image data assignment table. As shown in FIG. 13A, the image data assignment table has assignment matrix data for five images to assignment matrix data for twenty one images, and as shown in FIG. 13B, the number of images capable of being assigned to each page is set in each assignment data.

For example, if the template data selected by the user can assign twenty one images, CPU 206 operates to refer to the matrix data for twenty one images in the image data assignment table shown in FIGS. 13A and 13B read from HDD 209 into VRAM 208 to thereby acquire data of the number of images assigned to each page. Namely, in the case of the matrix data for twenty one images, the number of images capable of being assigned to the first page is 2, the number of images capable of being assigned to the second and third pages is 5, the number of images capable of being assigned to the fourth and fifth pages is 2, . . . , and the number of images capable of being assigned to the twelfth page is 2.

Figure 14:
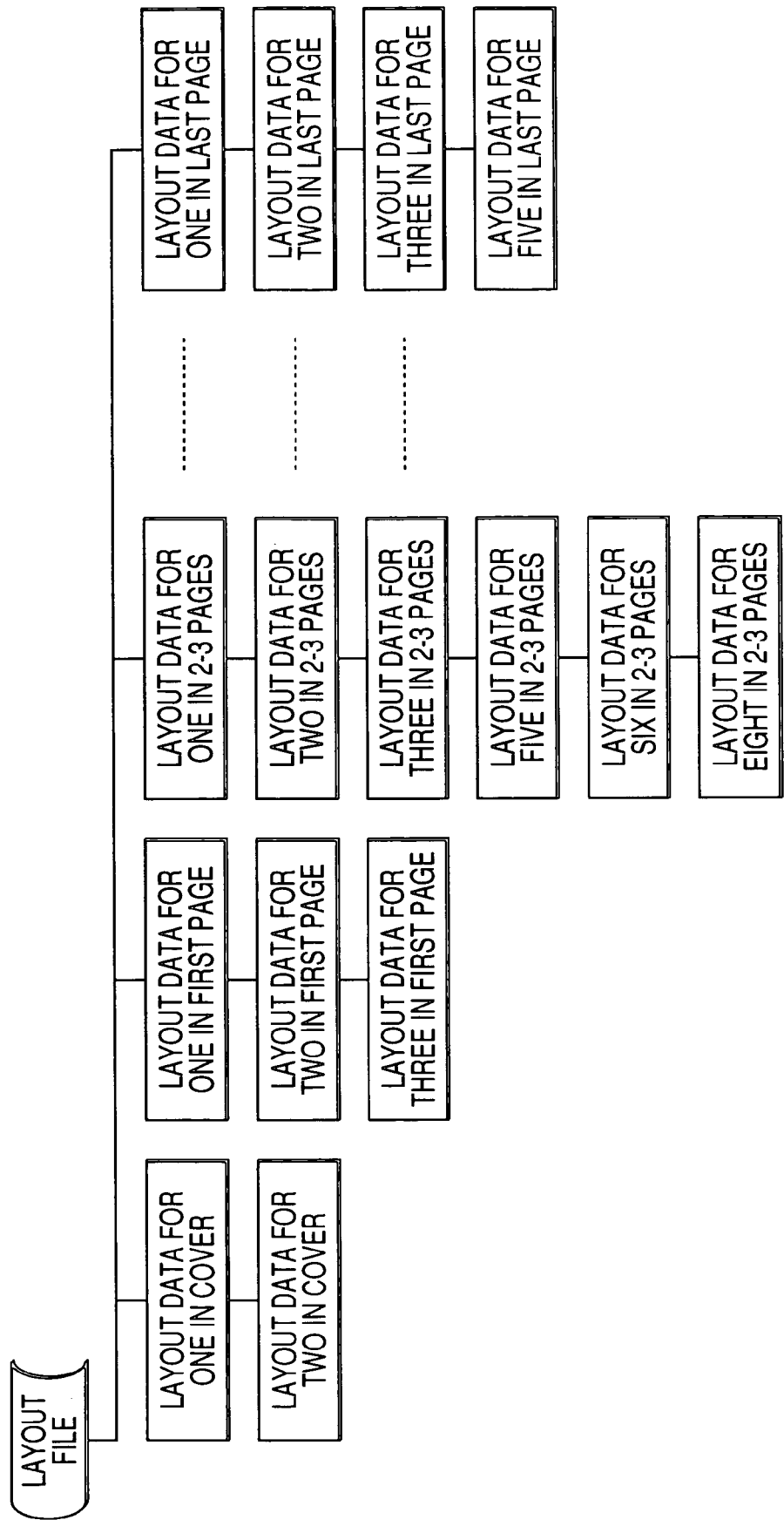
FIG. 14 is a schematic diagram showing the structure of a layout file.

As described above, if the template data capable of assigning twenty one images is selected, it can be decided from the image data assignment table shown in FIGS. 13A and 13B that the number of images capable of being assigned to the first page is 2, the number of images capable of being assigned to the second and third pages is 5, the number of images capable of being assigned to the fourth and fifth pages is 2, . . . , and the number of images capable of being assigned to the twelfth page is 2. A layout file shown in FIG. 14 stores layout data (layout data for two images in the first page), layout data (layout data for five images in the second and third pages), and other layout data. CPU 206 refers to the layout data of each page and determines the layout in the template data display area of the editing screen to thereby display the editing screen shown in FIG. 7.

Each layout data includes a resolution necessary for displaying a clear image in the frame in which image data is arranged, and the maximum number of characters for each font size capable of being entered in the character data frame in which character data is arranged. Each layout data may include a range of font sizes capable of being entered in each character data frame.

Figure 8:
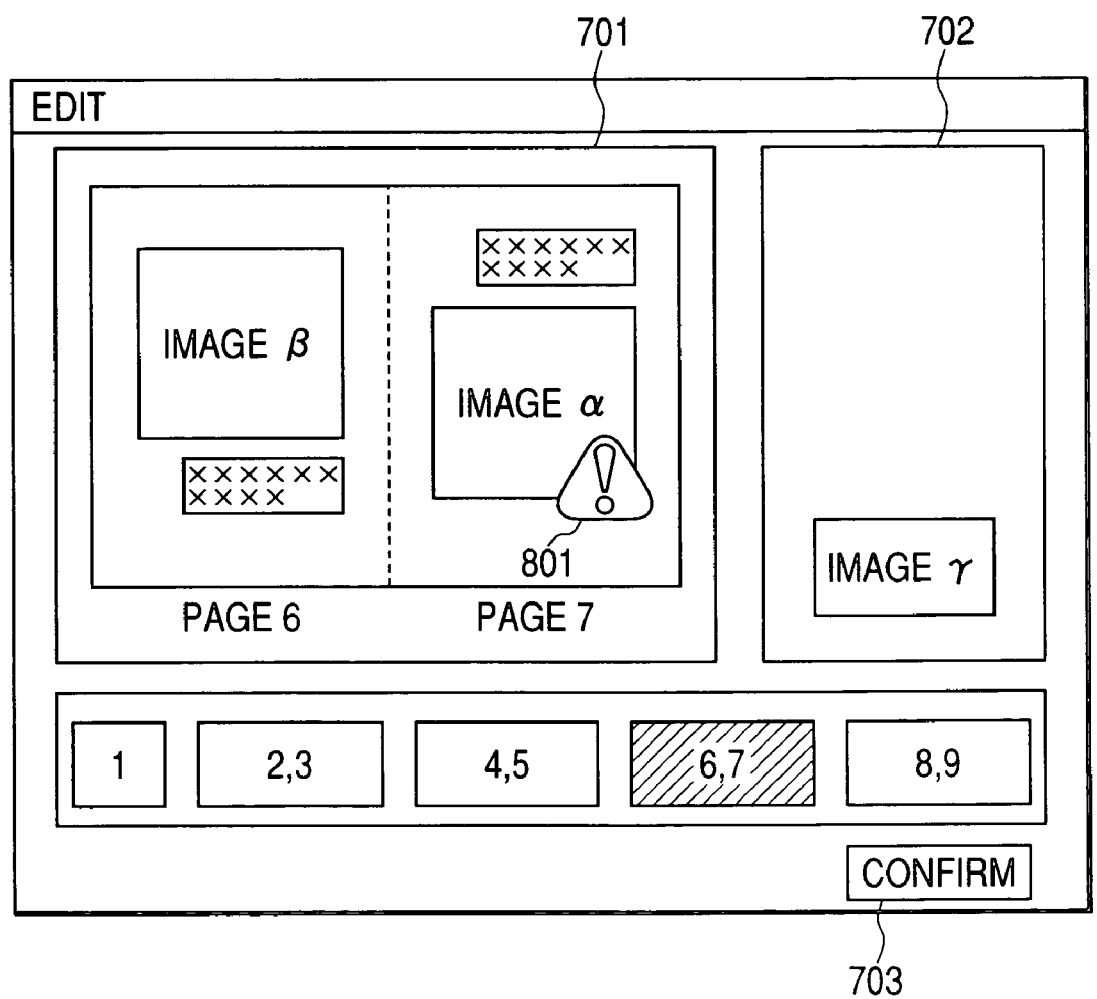
FIG. 8 is a diagram showing an example of an editing screen on which a warning mark is displayed.
Figure 9:
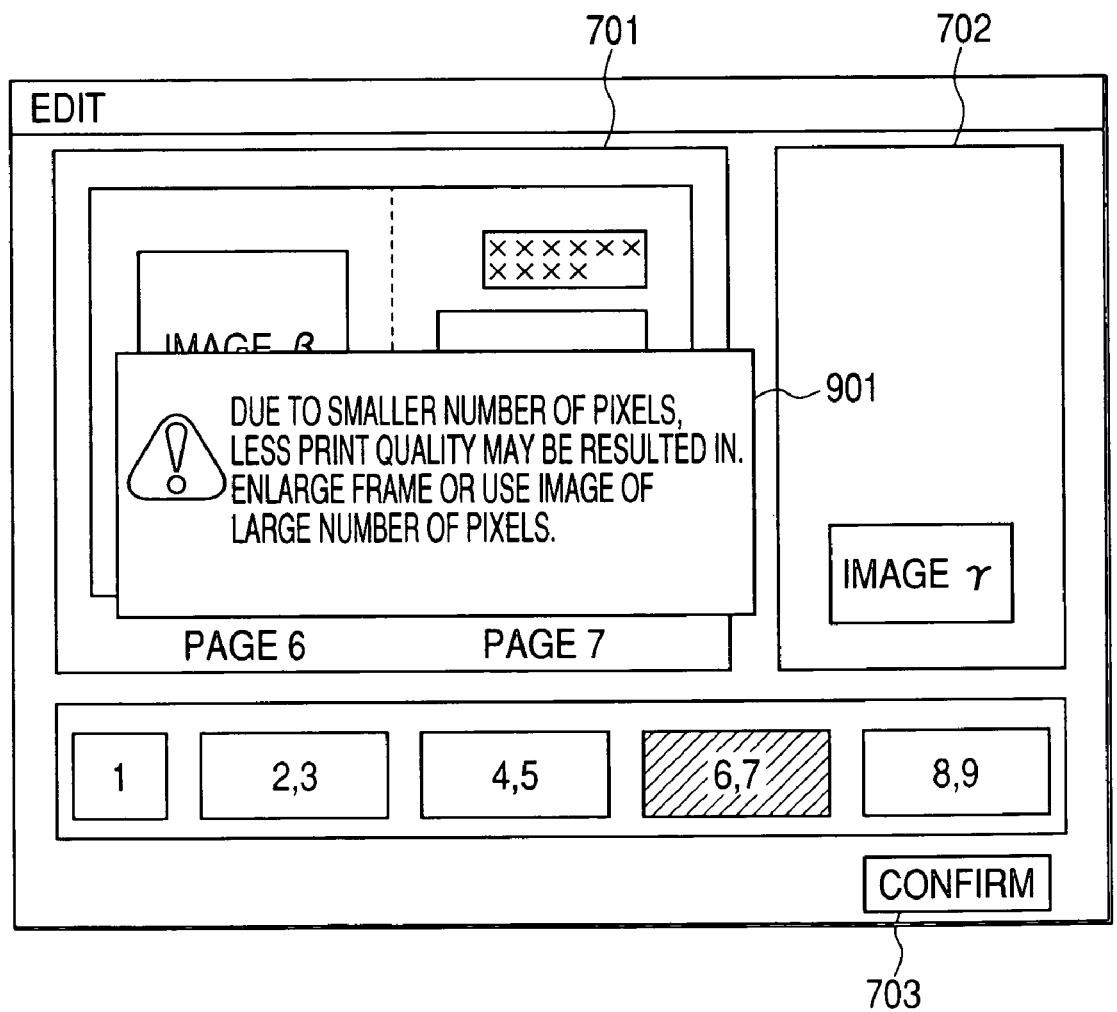
FIG. 9 is a diagram showing an example of an editing screen on which kinds of warning are displayed.

The user selects image data to be assigned to the frames A and B from the image data displayed in the image data display area 702. For example, if the image α is assigned to the frame B, a resolution of the image α obtained from a property of the image data is compared with a resolution set to the frame B. If the resolution of the image α is lower than the resolution set to the frame B, a warning mark 801 shown in FIG. 8 is displayed near the frame B. As the user moves the pointer to the warning mark 801 on the screen and double-clicks it, kinds of warning such as shown in FIG. 9 are displayed (901 in FIG. 9).

Warning information is also displayed if the user selects desired image data from the image data displayed in the image data display area 702 and a trimmed portion of the image data is arranged in the template data display area. In this case, a resolution of the trimmed image data is calculated from a ratio of the number of pixels in the trimmed area to the number of pixels of the whole image data. If the calculated resolution is lower than the resolution set to the frame, the warning information is displayed.

Displaying the warning information is not limited only to an insufficient resolution. For example, the warning information may be displayed if it is judged that the image quality after printing is deficient such as red-eye, defocus, camera shake, underexposure, or overexposure of each layout image. As a method of judging red-eye or the like, various techniques have already been disclosed. Therefore, these methods will not be described herein.

Warning information is also displayed not only for image data but also for character data in the character data frame. For example, the warning mark may be displayed near the character data frame if character data in excess of the maximum number of characters is entered or if the font size is out of the font size range.

By referring to the above-described kinds of warning, the user can change the image data to be assigned, reduce the number of characters and the like. The editing process may continue or completed by neglecting the warning without changing the image data assignment and character data to be input.

In FIGS. 7 to 9, although the editing screen is shown only for the sixth and seventh pages of the album, similar editing works are made for each page to form a desired album. For example, after the user assigns image data of all pages and inputs the character data, the user depresses a "confirm" button 703 shown in FIGS. 7 to 9.

Figure 10:
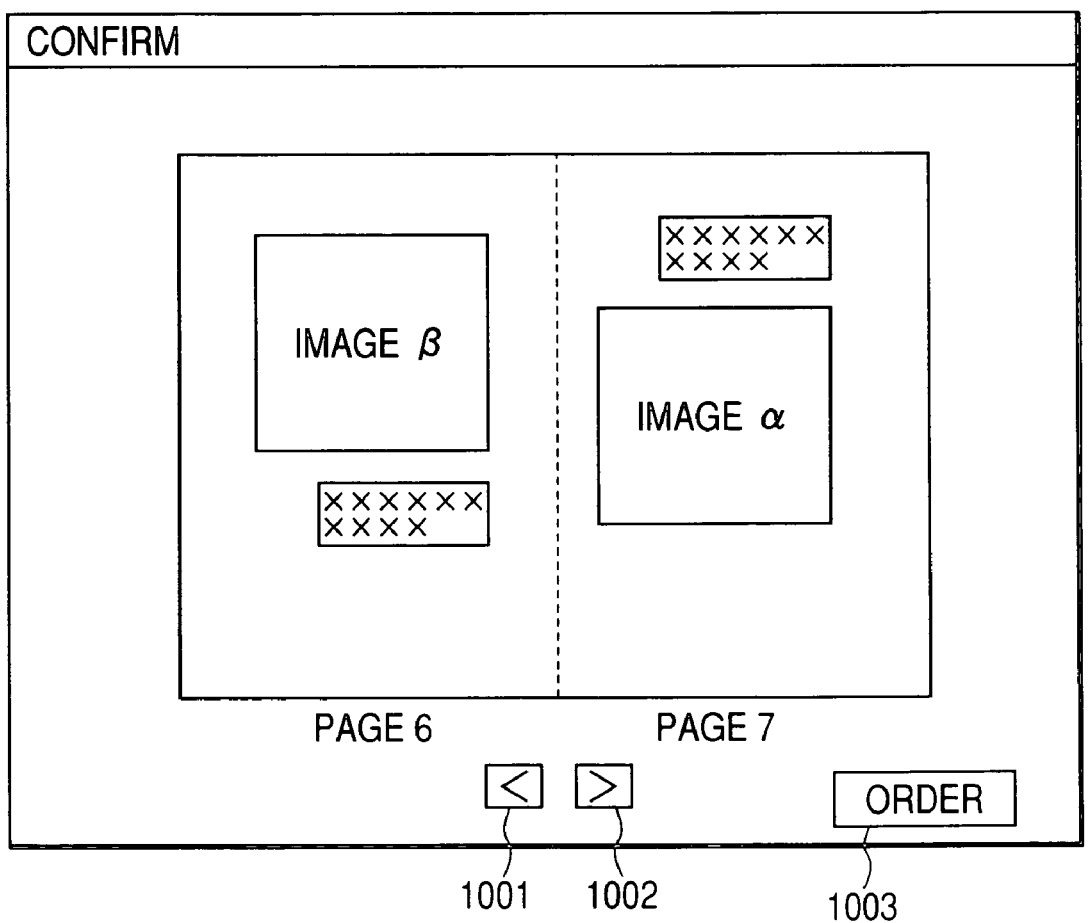
FIG. 10 is a diagram showing an example of a re-confirmation screen.

As the "confirm" button 703 is depressed, a confirmation screen shown in FIG. 10 is displayed on CRT 201. As a "<" button 1001 shown in FIG. 10 is depressed, the left page is turned and the fourth and fifth pages are displayed, whereas a ">" button 1002 is depressed, the right page is turned and the eighth and ninth pages are displayed. All pages of the created album can be confirmed by operating the "<" and ">" buttons 1001 and 1002. If there is no problem, the user depresses an "order" button 1003.

Figure 12:
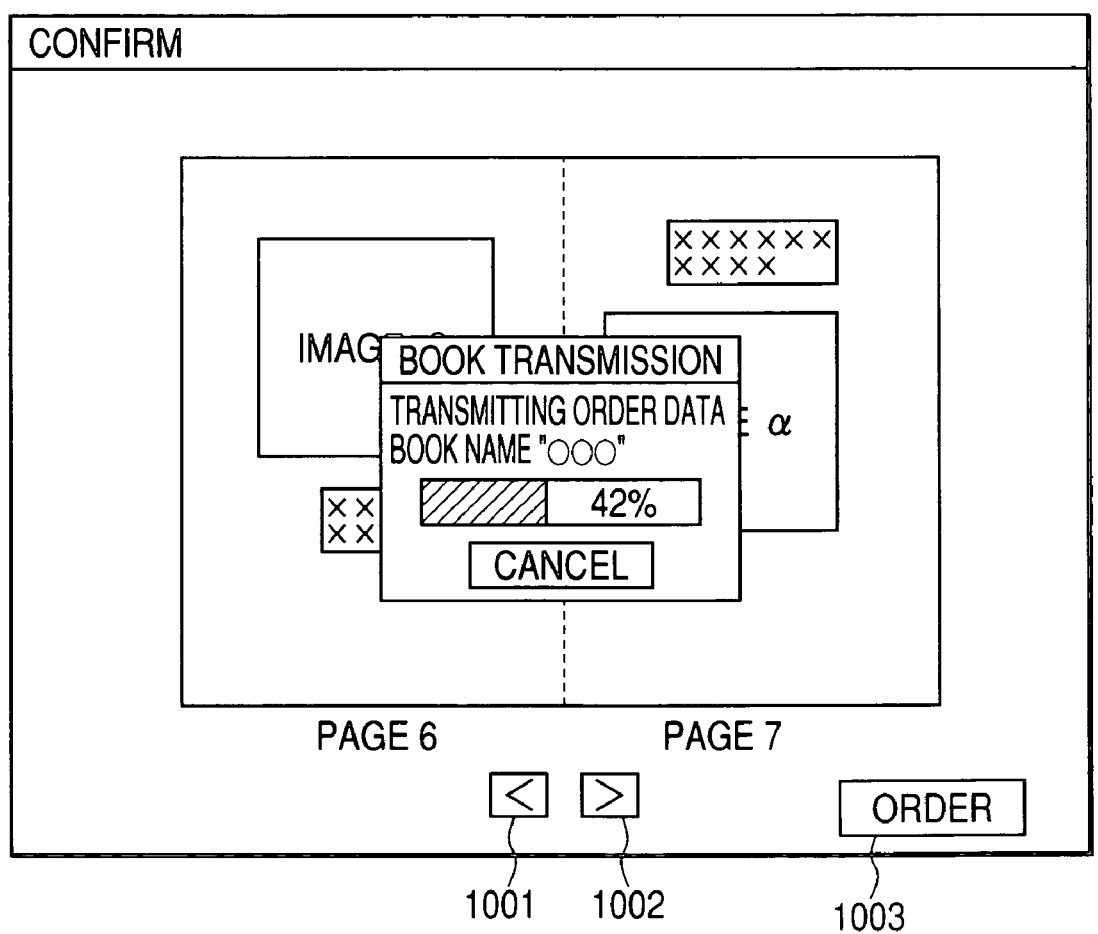
FIG. 12 is a diagram showing an example of the structure of a confirmation screen on which an order data transmission state is also displayed.

As the "order" button 1003 is depressed, order data is generated from the editing results (Step S404). Album data obtained by assigning the image data to the template data may be used as the order data or the template data assigned the image data and converted in one image file may be used. After the order data is generated, it is checked whether there is the image data to which the warning information shown in FIG. 9 is issued (Step S406), if such image data does not exist (No at Step S406), the generated order data is transmitted to the server 101 via the network interface 211 (step S405). As shown in FIG. 12, the transmission state of the order data is displayed with being superposed upon the confirmation screen shown in FIG. 10.

When the order data is transmitted, personal order information, album delivery address and the like entered by the user is also transmitted. The personal order information includes and an order person name, the number of orders and the like.

Figure 11:
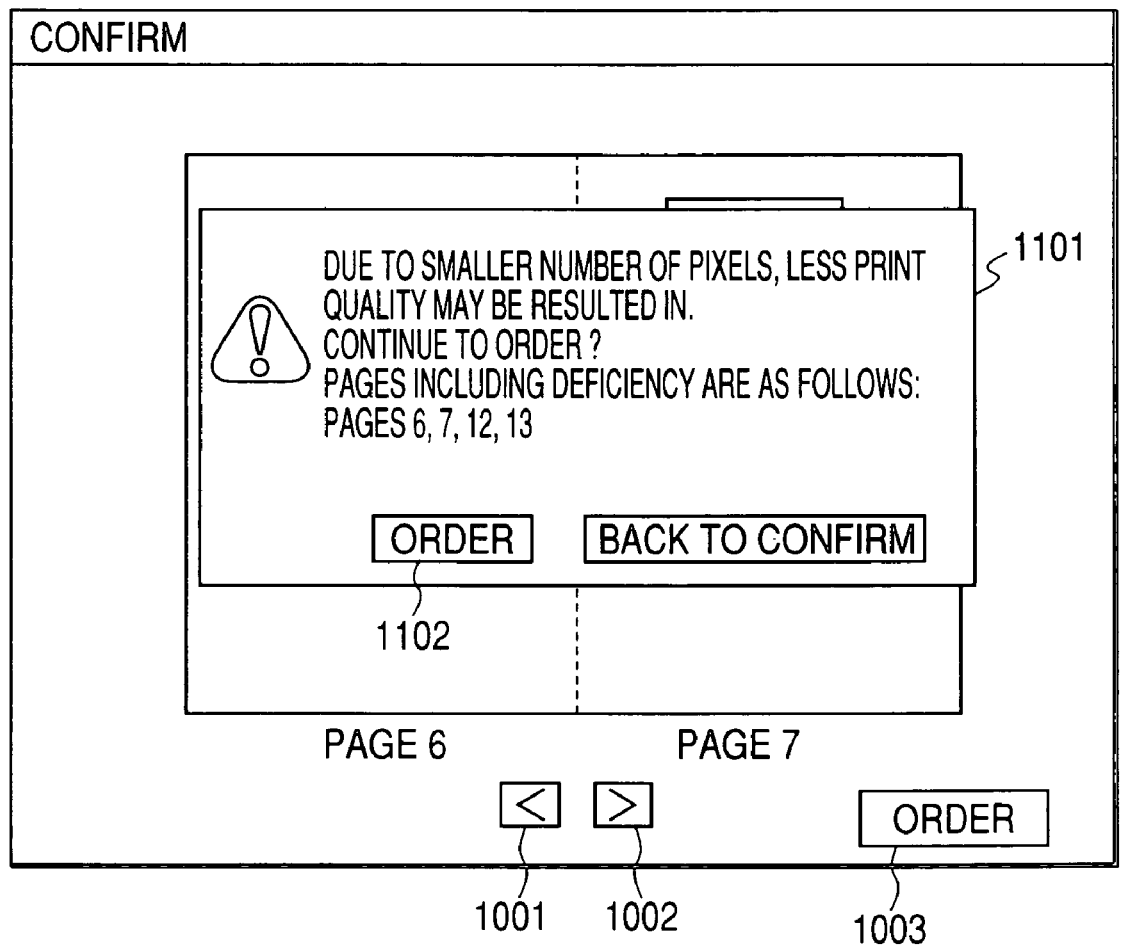
FIG. 11 is a diagram showing an example of an order re-confirmation screen.

In this embodiment, irrespective of the warning shown in FIG. 8 or 9, if it is judged at Step S406 that such image data exists, i.e., the album is ordered (Yes at Step S406), an order re-confirmation screen 1101 displaying the kinds of warning during editing the album is displayed as shown in FIG. 11. If an "order" button 1102 in the re-confirmation screen is depressed, warning information is generated from an image ID and kinds of warning of a corresponding image (Step S407), and the order data, personal order information and delivery address as well as the warning information are transmitted to the server 101 (Step S405).

Figure 20:
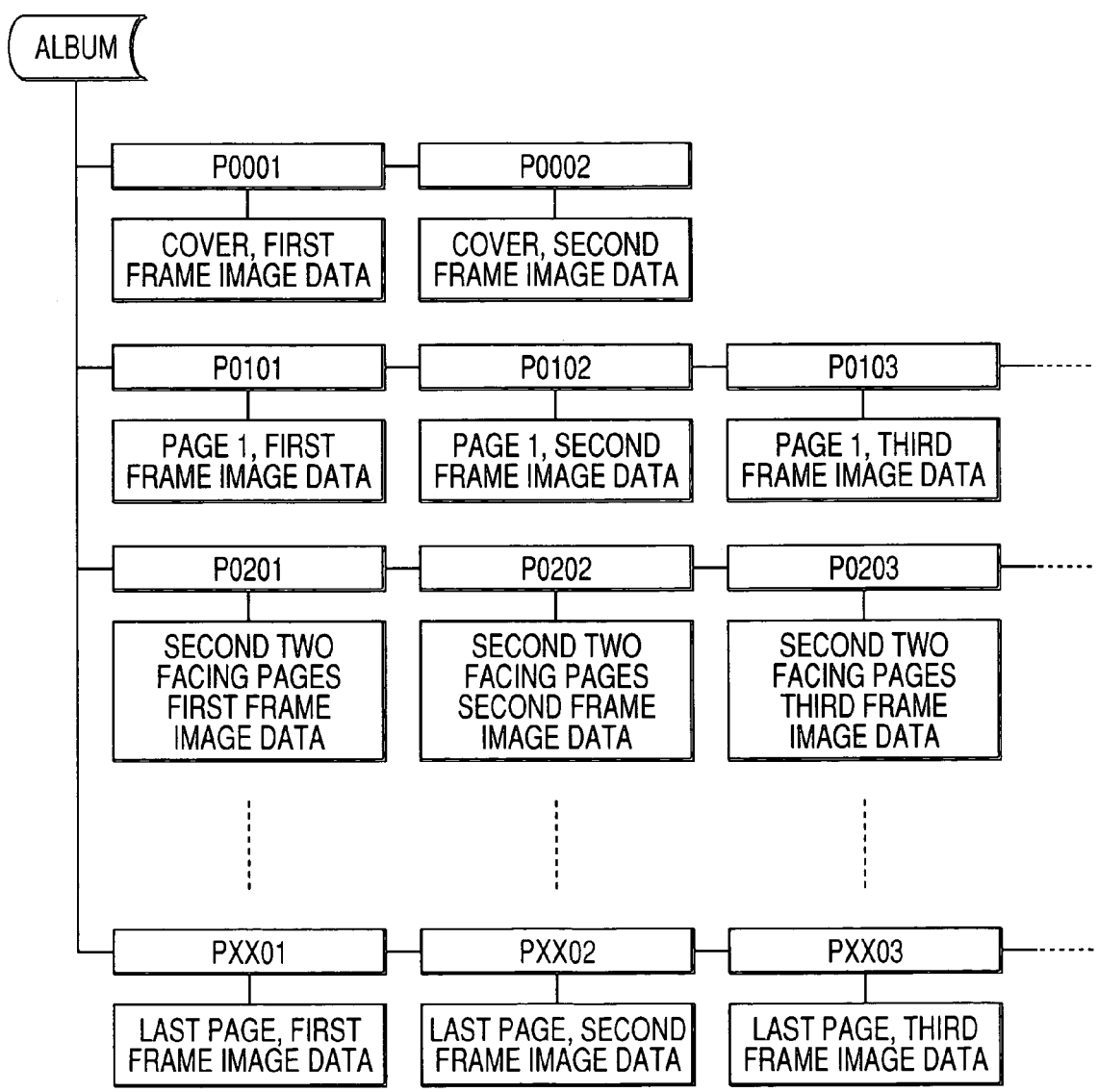
FIG. 20 is a schematic diagram showing the structure of image management for an album.

FIG. 20 is a schematic diagram showing the structure of image management for an album illustrating the image ID. Album data generated by the album editing application 1022 has images in the unit of page and is managed by the image ID determined from the page number and the frame in which the image is arranged. For example, the image ID of an image arranged in the second two facing pages and in the third frame is "P0203". In this embodiment, the frame A shown in FIG. 7 corresponds to the first frame, and the frame B corresponds to the second frame. By using the image ID, the position of the image in an album can be identified uniquely.

In this embodiment, although the image ID is managed in the unit of frame, the definition of the image ID is not limited thereto, but the image ID may be managed in the unit of image. For example, IDs may be serial numbers of all images in an album, or IDs may be managed by the name of an image file.

In this embodiment, since the character data frame corresponds to the image frame, it is not assigned an another ID. However, another ID may be assigned to each character data frame separately from the image data frame.

Figure 21:
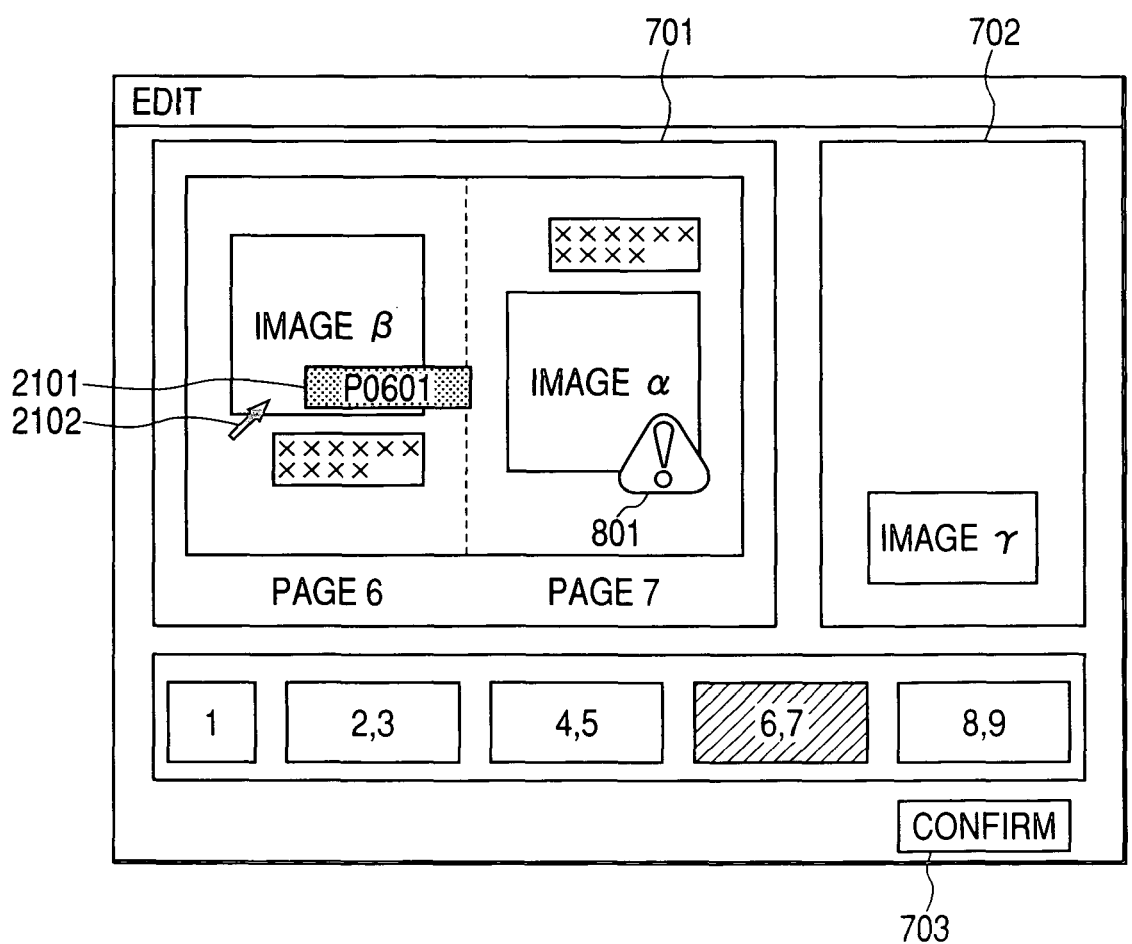
FIG. 21 is a diagram showing an example of an editing screen on which image IDs are displayed.

A user can also refer to the image ID. As shown in FIG. 21, when the user moves a mouse cursor 2102 to an image β, an image ID 2101 is displayed near the image β. The user can know the image ID from this screen.

FIG. 15 is a diagram showing an example of a list of warning images which are transmitted to the server 101 as the warning information.

If the user at the user terminal 102 depresses the "order" button 1003 without changing image data to a proper resolution and reducing the size of the character data, irrespective of warning, the warning image list having a correspondence between the page number, assigned image ID and kinds of warning is generated and transmitted from the user terminal 102 to the server 101.

Figure 5:
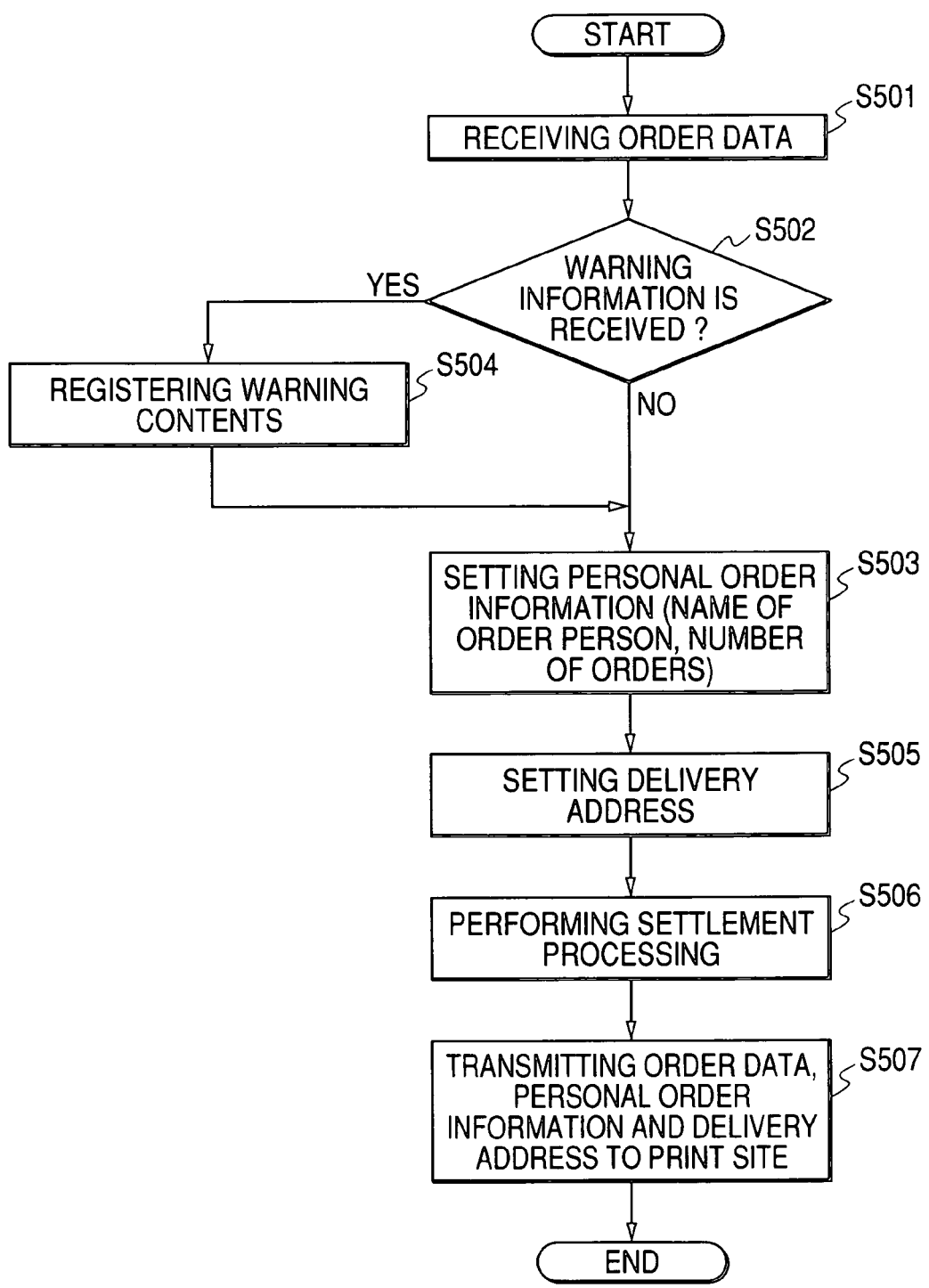
FIG. 5 is a flow chart illustrating an operation of the server.

Next, with reference to the flow chart of FIG. 5, the operation of the server 101 will be described. Upon reception of order data, personal order information and the like from the user terminal 102 via the network interface 211 (Step S501), CPU 206 operates to register an order person name, the number of orders and the like in correspondence with a present order (Step S503), and then executes a process of determining an album delivery address. An order ID as identification information of the present order and a book ID which is identification information of the album related to the present order data are generated and stored in an order book management table shown in FIG. 16. The order book management table is stored in a hard disk in HDD 209.

If the warning image list together with the order data and the like is received (Yes at Step S502), information in the warning image list is registered in the warning image management table (Step S504). If the book ID of the album related to the presently received order data is "BK0002", as shown in FIG. 17 the kinds of warning shown in FIG. 15 are registered in the warning image management table in correspondence with the book ID. The warning image management table is stored in a hard disk in HDD 209.

After CPU 206 executes the process of determining the album delivery address (Step S505), a settlement process of the present order is executed in cooperation with the user terminal 102 (Step S506). After the settlement process is completed, a print company is determined at which the print processing for the present order is executed. In determining the print company, an optimum print company is selected by considering the type of the ordered album, a distance to the album delivery address and the like.

Next, CPU 206 operates to transmit the order data, personal order information and delivery address information to the print site (e.g., the print site 103) of the determined print company via the network interface 211 (Step S507). At the print company of the print site 103 received the order data, the print processing is performed in accordance with the order data, albums corresponding to the designated number of orders are made and sent to the delivery address indicated in the delivery address information. Each album is printed with a book ID. An album with a sheet of a printed book ID is sent.

Figure 22:
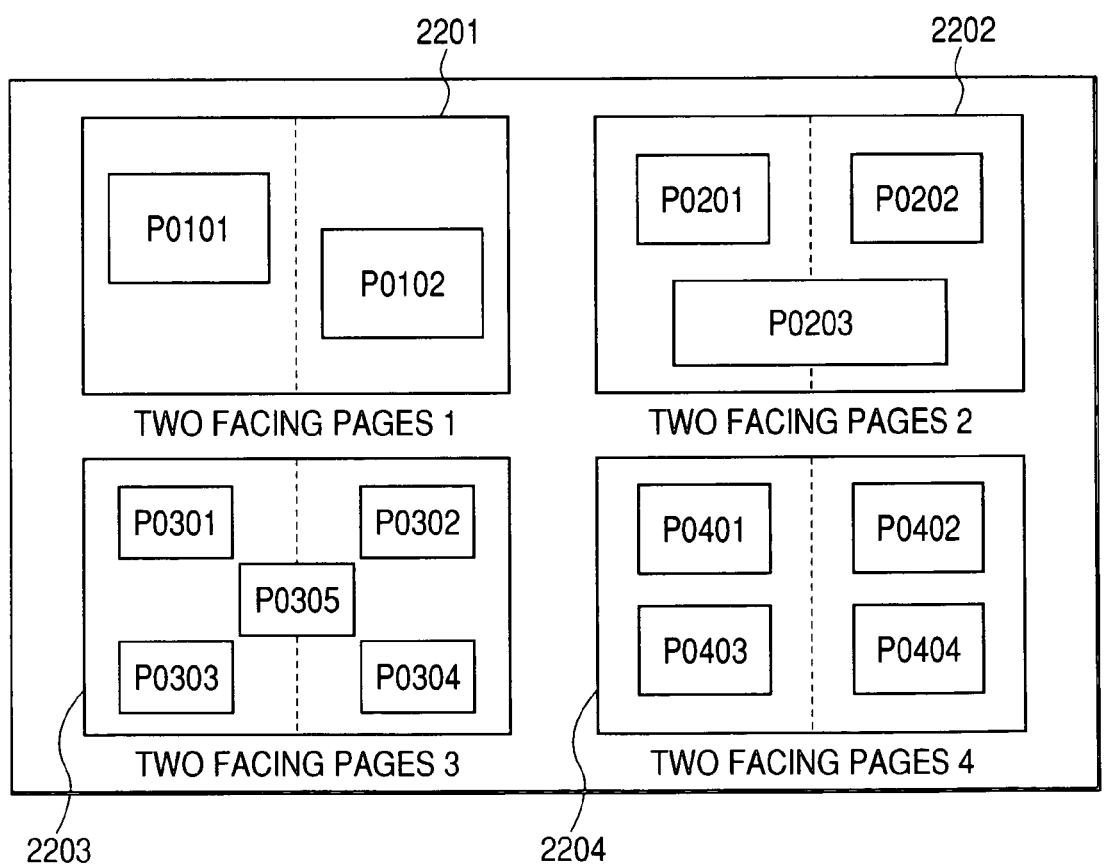
FIG. 22 is a diagram showing an example of an ID sheet.

An ID sheet printing an image ID of each image in the album is also sent. FIG. 22 shows an example of the ID sheet. On each ID sheet, data 2201 to 2204 corresponding to four facing pages reduced in size is printed. An image ID is written in the image data frame instead of the image data. By using this sheet, the user can know the image ID even if the user erases the album data after its order.

Information registered in the warning image management table shown in FIG. 17 is transmitted from the server 101 to the operator PC 106 in response to a request from the operator PC 106. For example, if a user who transmitted order data containing deficiency inquires later an operator about the deficiency, the operator operates the operator PC 106 to acquire the kinds of warning contained in the order data from the server 101. By referring to the kinds of warning, the operator can answer the user. Namely, when a user inquires the operator, the operator obtains the book ID written in the album from the user, and inquires the server 101 about the book ID by using the operator PC 106. It is therefore possible to return the page numbers, image IDs and kinds of warning registered in correspondence with the book ID, from the server 101 to the operator PC 106 and display these information on the screen so that the operator can answer the user.

By referring to the album data or ID sheet, the user informs the operator of the image ID of the image for which the inquiry was made. It is therefore possible for the user to uniquely identify the image in the album for which the inquiry was made.

As described above, according to the embodiment, when a user who received an album inquires an operator about a deficiency of the album, the operator can deal with the inquiry properly in accordance with the warning information registered in correspondence with the book ID of the album.

Further, according to the embodiment, since the image ID is stored in correspondence with the kinds of warning, an operator can grasp easily the image inquired by a user so that conversation with the user becomes smooth. It is also possible to know easily the presence/absence of the warning information and kinds of warning of the image so that the user can be handled properly.

Figures 18, 19:
FIG. 18 is a diagram showing an example of a claim management table.
FIG. 19 is a diagram showing an example of a re-order rejection screen.

Furthermore, in the embodiment, an album ordered once can be re-ordered only by designating the book ID, the number of orders and delivery address from the user terminal 102 to the server 101. If there is any claim from a user during an inquiry about a deficiency of the print product of the image data containing the warning information, an operator operates the operator PC 106 to input a corresponding book ID, a claim type, claim data and claim contents and transmit the input information to the server 101. The server 101 manages the input information in a claim management table shown in FIG. 18. The claim management table is registered in a hard disk in HDD 209. An album having a registered book ID is rejected to be re-ordered. For example, as shown in FIG. 18, when the server 101 receives a re-order of the album having the book ID "BK0002", the server 101 refers to the claim management table. Since this book ID is registered, screen information such as shown in FIG. 19 is transmitted to the user terminal 102 to notify a user of a rejection of the re-order. If the user re-edits the album by using the album editing application 1022 and orders a print product, the server 101 recognizes the album data as a new album and assigns a new book ID.

As described above, according to the embodiment, a re-order from a user is restricted so that it is possible to prevent the user from re-ordering the album with a deficiency.

In this embodiment, the album editing application is activated at the user terminal 102 to execute an album editing process. The embodiment is not limited thereto, but the user terminal 102 may upload necessary images to the server via the network, to execute the album editing processing by activating a browser and communicating with the server.

It is needless to say that the objects of the invention can be achieved by supplying a storage medium storing software program codes realizing the function of the embodiment described above to a system or an apparatus and by making a computer (CPU or MPU) of the system or apparatus read and execute the program codes stored in the storage medium.

In this case, the software program codes read from the storage medium themselves realize the embodiment function. Therefore, the program codes themselves and the storage medium storing the program codes constitute the present invention.

The storage medium for storing the program codes may be a flexible disk, a hard disk, an optical disk, a magneto optical disk, a CD-ROM, a CD-R, a magnetic tape, a nonvolatile memory card, a ROM or the like.

It is obvious that the invention also includes the case wherein the computer executes the read program codes and an OS (basic system or operating system) or the like running on the computer executes a portion or all of the actual processes in accordance with instructions of the program codes, to thereby realize the embodiment function.

It is obvious that the invention also includes the case wherein the program codes read from the storage medium are written into a memory of a function expansion board inserted into a computer or of a function expansion unit connected to the computer, and thereafter a CPU or the like of the function expansion board or function expansion unit executes a portion or all of the actual processes to thereby realize the embodiment function.

The present invention is not limited to the above embodiments and various changes and modifications can be made within the spirit and scope of the present invention. Therefore to apprise the public of the scope of the present invention, the following claims are made.

This application claims priority from Japanese Patent Application No. 2004-257625 filed on Sep. 3, 2004, which is hereby incorporated by reference herein.

What is claimed is:

1. An information processing system comprising a user terminal, a server apparatus, and a print site, which communicate with each other via a communication line, said user terminal comprising:
an order data generating unit configured to generate order data by laying out a plurality of image data on a page;
a decision unit configured to decide whether a resolution of the image data is smaller than a predetermined resolution;
a warning unit configured to display a warning when said decision unit decides during the laying-out by said order data generating unit that the resolution of the image data to be laid out by said order data generating unit is smaller than the predetermined resolution;
a warning information generating unit configure to generate warning information related to the order data generated by said order data generating unit, when said decision unit decides after completion of order data generation by said order data generating unit that the resolution of the image data related to the generated order data is smaller than the predetermined resolution; and
a transmitting unit configure to transmit the order data and the generated warning information to said server apparatus, said print site comprising:
a receiving unit configured to receive the order data from said server apparatus; and
a forming unit configured to execute print processing to form print data based on the order data received by said receiving unit, thereby forming a print product, and said server apparatus comprising:
a storing unit configure to store, in relation to the order data, the warning information transmitted by the transmitting unit of the user terminal and inquiry information indicating contents of an inquiry about the print product;
an order data decision unit configure to decide whether the order data received from said user terminal is the same as order data stored by said storing unit in relation to the warning information and the inquiry information; and
a notifying unit configure to notify said user terminal that an order of print processing of the order data is not acceptable, when said order data decision unit decides that the order data transmitted by said user terminal is the same as order data stored by said storing unit.

2. A system according to claim 1, wherein the decision unit of the user terminal further decides whether a number of character data included in the order data generated by said order data generating unit exceeds a maximum number of character data, and said warning information generating unit generates the warning information when said decision unit decides that the number of the character data included in the generated order data exceeds the maximum number of character data.

* * * * *